United States Patent
Borzy et al.

(10) Patent No.: US 10,870,376 B2
(45) Date of Patent: Dec. 22, 2020

(54) TRIM COVER STEAM MACHINE (71) Applicant: Magna Seating Inc, Aurora (CA)

(72) Inventors: Stephan M Borzy, Wellington, OH (US); Richard J Palowitz, Warren, OH (US)

(73) Assignee: Magna Seating Inc, Aurora (CA)

( * ) Notice: Subject to any disclaimer, the term of this patent is extended or adjusted under 35 U.S.C. 154(b) by 65 days.

(21) Appl. No.: 15/916,459

(22) Filed: Mar. 9, 2018

(65) Prior Publication Data
US 2018/0257525 A1 Sep. 13, 2018

Related U.S. Application Data (60) Provisional application No. 62/469,744, filed on Mar. 10, 2017.

(51) Int. Cl.
| | | |
|---|---|---|
| *B60N 2/58* | (2006.01) | |
| *B29D 99/00* | (2010.01) | |
| *B29C 51/42* | (2006.01) | |
| *B29C 51/14* | (2006.01) | |
| *B29C 35/04* | (2006.01) | |

(52) U.S. Cl.
CPC .......... *B60N 2/5816* (2013.01); *B29C 35/049* (2013.01); *B29C 51/145* (2013.01); *B29C 51/421* (2013.01); *B29D 99/0092* (2013.01); *B60N 2/58* (2013.01); *B60N 2/5891* (2013.01)

(58) Field of Classification Search
CPC .. B60N 2/5816; B60N 2/5891; B29C 35/049; B29C 51/145; B29C 51/421; D06F 71/00; D06F 71/40; D06C 15/00; A41H 5/00
See application file for complete search history.

(56) References Cited

U.S. PATENT DOCUMENTS

| | | | | |
|---|---|---|---|---|
| 1,492,083 A | * | 4/1924 | Pegues | D06F 87/00 223/51 |
| 2,243,550 A | * | 5/1941 | Carl | A61H 33/06 4/532 |
| 2,587,745 A | * | 3/1952 | Maurer | D06F 73/00 223/70 |
| 2,667,291 A | * | 1/1954 | Petrich | D06F 73/00 223/70 |
| 3,224,654 A | * | 12/1965 | Giuseffi | D06F 71/26 223/57 |
| 3,568,900 A | * | 3/1971 | Paris | D06F 73/00 223/70 |
| 3,883,051 A | * | 5/1975 | Bailey | D06F 71/29 223/51 |
| 4,199,088 A | * | 4/1980 | Sanko | D06F 73/00 223/67 |
| 4,844,761 A | | 7/1989 | Bracesco | |
| 4,979,890 A | | 12/1990 | Bracesco | |
| 5,287,610 A | | 2/1994 | Gomolak et al. | |

(Continued)

*Primary Examiner* — Ismael Izaguirre
(74) *Attorney, Agent, or Firm* — Miller Canfield (57) ABSTRACT

An assembly and method for steaming and/or heating a trim cover of an upholstered article is disclosed. The assembly includes a stand having a bottom end and a top end, an open frame attached to the top end of the stand and adapted to receive at least a portion of the trim cover, and a steam supply system. At least a portion of the steam supply system is adapted to fit within the frame and the steam supply system applies steam towards at least one interior steam zone of the trim cover.

18 Claims, 10 Drawing Sheets

(56) References Cited

U.S. PATENT DOCUMENTS

| | | | |
|---|---|---|---|
| 5,338,386 A | 8/1994 | Frelich et al. | |
| 5,468,433 A | 11/1995 | Perry et al. | |
| 5,687,278 A * | 11/1997 | Turner | D06F 71/29 |
| | | | 219/211 |
| 7,324,745 B1 | 1/2008 | Taylor | |
| 7,404,264 B2 * | 7/2008 | Heinz | B60N 2/5891 |
| | | | 34/558 |
| 2005/0198874 A1 * | 9/2005 | Wurm | B60N 2/5891 |
| | | | 38/1 A |
| 2007/0137014 A1 | 6/2007 | Montgomery | |
| 2012/0159806 A1 * | 6/2012 | Dana | D06F 58/203 |
| | | | 34/444 |

* cited by examiner

TRIM COVER STEAM MACHINE

CROSS-REFERENCE TO RELATED APPLICATIONS

This application claims priority to U.S. provisional patent application No. 62/469,744, filed Mar. 10, 2017, which is hereby incorporated by reference in its entirety.

FIELD OF THE INVENTION

The present disclosure relates to trim covers. More particularly, the present disclosure relates to an assembly and a method for applying steam and/or heat to a trim cover prior to placing the trim cover over a cushioned pad to create an upholstered article.

BACKGROUND

Trim covers for upholstered articles are used in a number of industries and applications. For example, automotive vehicles typically include one or more seat assemblies, which can include vehicle seats. Vehicle seats typically include a seat frame and seat cushion (or pad) that require one or more seat covers (sometimes called trim covers). Trim covers can be made of a number of materials such as vinyl, cloth, leather, synthetic fabric or any combination of the above.

Trim covers can be installed on the vehicle seat cushion prior to installing the vehicle seat into a vehicle, by placing the trim cover over the vehicle frame and cushion material. Trim covers often are used to maintain the longevity and durability of the vehicle seat and can improve the aesthetic appeal of the vehicle seat.

However, trim covers can become wrinkled during the shipping and storage process. This can make it more difficult to install the trim cover over a vehicle seat cushion and it reduces the aesthetic appeal of the finished product.

It has been proposed to use heat, steam or a combination of both to remove these wrinkles and facilitate installation of the trim cover on the vehicle seat cushion and to improve the aesthetic appearance of the finished upholstered article.

Conventional processes often use heat to de-wrinkle the trim cover. In the automobile industry, large heating ovens may be used to heat multiple trim covers simultaneously before they are installed on the vehicle seat cushion. In addition, manually operated heating or steaming devices such as steam irons may be used. An operator can manually press the heating device against the trim cover to apply heat or steam individually to a trim cover after the trim cover has been installed on a vehicle seat cushion to remove wrinkles and other imperfections. Example heating systems are disclosed in U.S. Pat. No. 5,287,610 to Gomolak et al. and U.S. Pat. No. 7,324,745 to Taylor.

However, existing systems using large ovens can be energy and labor intensive. Manually operated heating devices for use after installation on the vehicle seat cushion are often time-consuming, lack quality control and can be ineffective in removing imperfections and wrinkles. Additional difficulties with existing systems may be appreciated in view of the Detailed Description of Example Embodiments, below.

It is desirable to provide an assembly for pre-steaming and/or pre-heating the trim cover before it is installed on a cushioned pad, such as a vehicle seat cushion, that overcomes some of the disadvantages of existing systems.

SUMMARY OF THE INVENTION

There is disclosed a method and assembly for steaming and/or heating a trim cover of an upholstered article prior to installation of the trim cover over the cushioned pad of an upholstered article. The assembly includes a frame disposed on top of a stand. The frame can be made of metal tubing with a series of apertures that allow steam to escape from the metal tubing and into the frame when the trim cover is placed over the frame. A steam supply system includes at least one conduit that is disposed within the frame and transports steam from a steam producing component into the assembly to steam and/or heat the trim cover after it has been placed over the frame.

In one broad aspect, there is disclosed an assembly for steaming and/or heating a trim cover of an upholstered article comprising:
  A stand having a bottom end and a top end;
  An open frame attached to the top end of the stand and operable to receive at least a portion of the trim cover; and
  A steam supply system, wherein at least a portion of the steam supply system is adapted to fit within the frame and the steam supply system is adapted to apply steam to an interior steam zone of the trim cover.

In another aspect, there is disclosed a method of steaming and/or heating a trim cover of an upholstered article, comprising the steps of:
  Providing a frame operable to receive at least a portion of the trim cover;
  Disposing the trim cover over at least a portion of the frame;
  Providing a steam supply system wherein at least a portion of the steam supply system is adapted to fit within the frame; and
  Applying steam to an interior steam zone of the trim cover.

In at least some embodiments, the steam is applied to a plurality of interior steam zones and the steam may be applied independently to each of the plurality of interior steam zones.

In another broad aspect, there is disclosed an assembly for de-wrinkling a trim cover of a vehicle seat cushion, the assembly comprising:
  A stand having a bottom end and a top end;
  An open frame attached to the top end of the stand, the frame being comprised of metal tubing, wherein the frame is approximately the height, width, and length of the vehicle seat cushion and is operable such that the trim cover can be stretched tightly over the frame, and the frame further comprises a shield portion at an end of the frame for containing a volume of steam within the assembly; and
  A steam supply system, wherein at least a portion of the steam supply system is adapted to fit within the frame and the steam supply system is adapted to apply steam to a plurality of interior steam zones of the trim cover It will be seen that although the present example described herein relates to an assembly and method for de-wrinkling a trim cover prior to the trim cover being installed on a vehicle seat cushion, the invention is not limited to this use but can be used for steaming and/or heating any number of covers for upholstered articles.

Directional references herein such as "front", "rear", "up", "down", "horizontal", "top", "bottom" and the like are used purely for convenience of description and do not limit the scope of the invention described herein. Furthermore, any dimensions provided herein are presented merely by way of an example and unless otherwise specified do not limit the scope of the invention. Furthermore, geometric terms such as "straight", "flat", "curved", "point" and the like are not intended to limit the invention to any specific level of geometric precision, but should instead be understood in the context of the invention taking into account normal manufacturing tolerances, as well as the functional requirements of products in the field of the invention wherein it would be understood that a high level of precision may not be required.

BRIEF DESCRIPTION OF THE DRAWINGS

Advantages of the present disclosure will be readily appreciated as the same becomes better understood by reference to the following detailed description when considered in connection with the accompanying drawings wherein.

Similar reference numerals may have been used in different figures to denote similar components.

DETAILED DESCRIPTION OF EXAMPLE EMBODIMENTS

The present invention is described in the context of a preferred use for de-wrinkling a trim cover of an automobile vehicle seat cushion by applying steam to one or more steam zones of the trim cover. However, it will be seen that the invention may be readily adapted for using steam or other forms of heat to pre-treat any number of trim covers.

Figure 1:
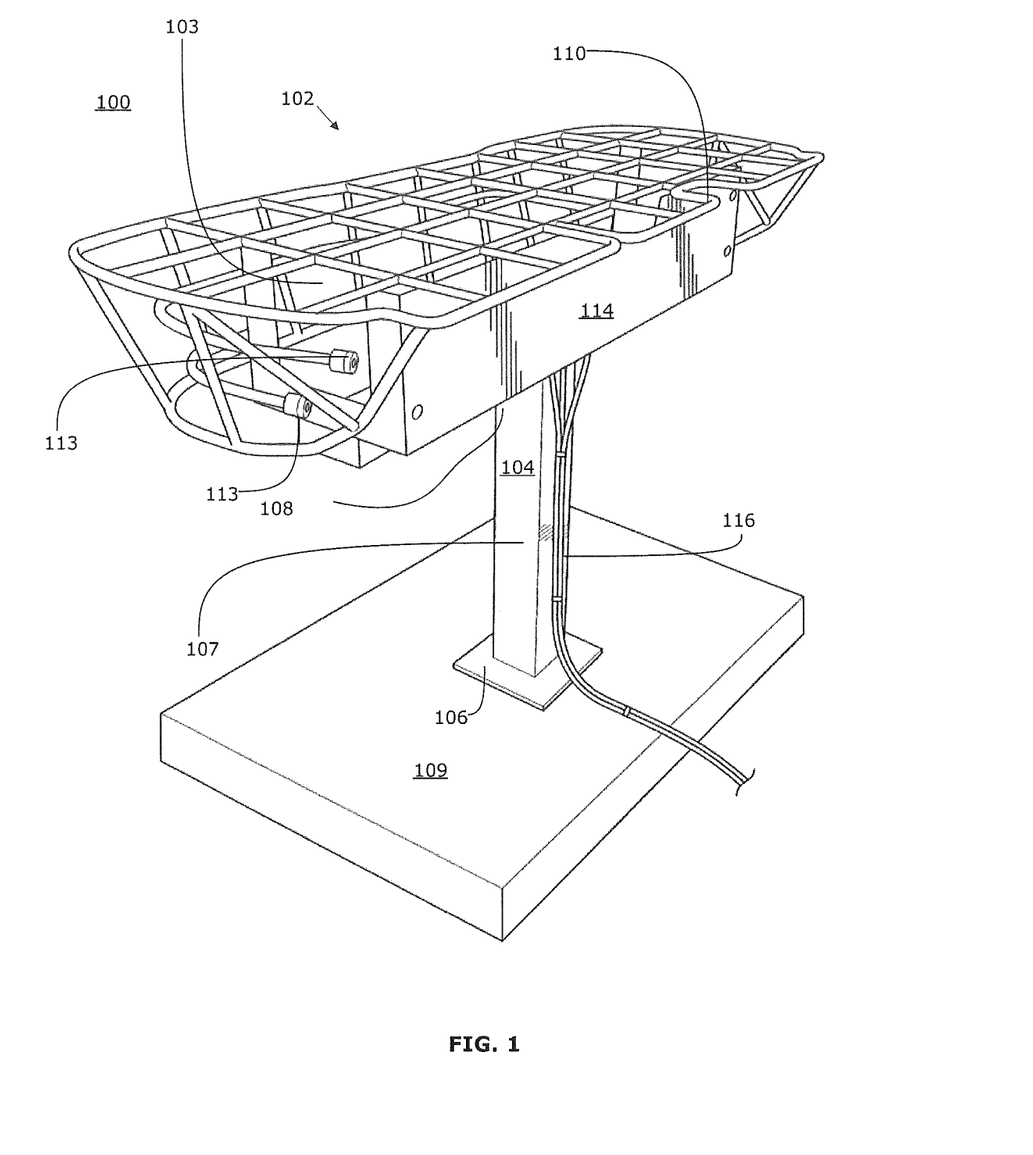
FIG. 1 is a perspective view of an assembly in accordance with one embodiment of the present disclosure.
Figure 2:
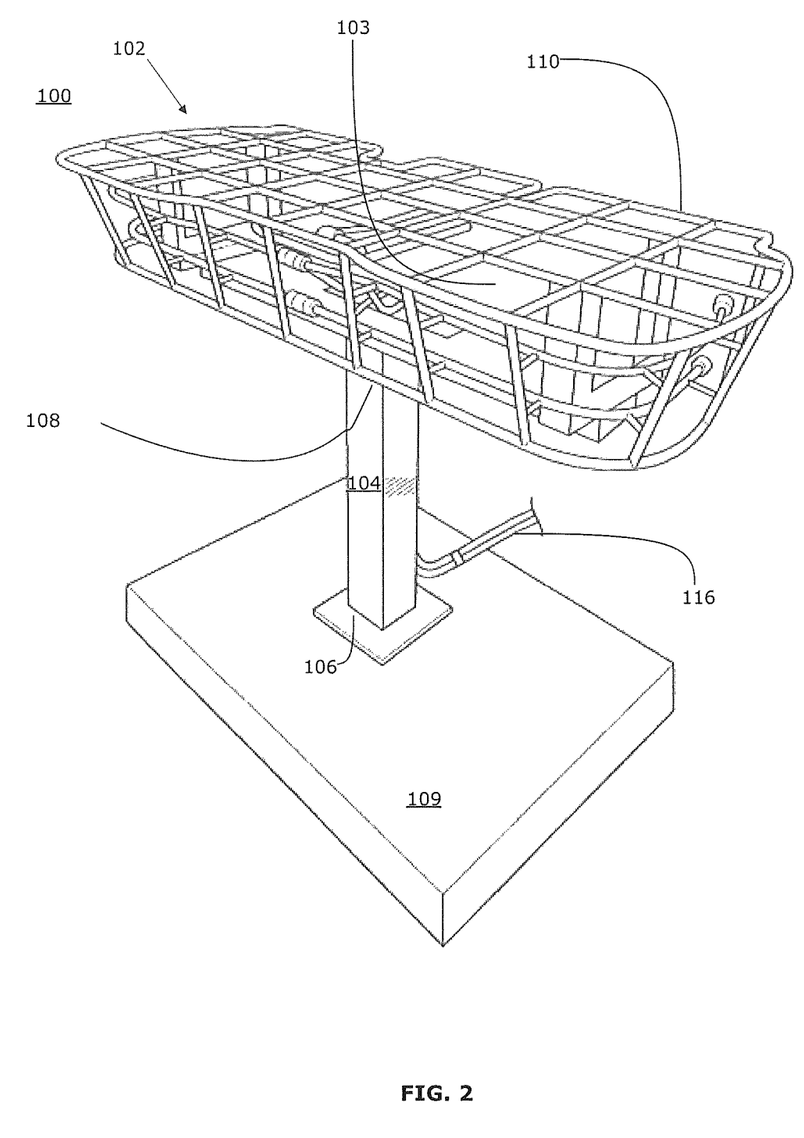
FIG. 2 is a front perspective view of the assembly of FIG. 1.

Referring now to FIGS. 1 to 4, an assembly 100 for steaming and/or heating a trim cover 120 of an upholstered article such as a vehicle seat cushion is illustrated in FIG. 1. Assembly 100 can operate in a variety of environments including an assembly area or a production factory. The assembly 100 includes an open frame 102 operable for receiving a trim cover 120 of an upholstered article and a stand 104 for supporting frame 102. Assembly 100 includes a power supply system (not shown) which in some embodiments may be housed within a junction box and wiring disposed on the stand 104 and which is connected to a 110-volt outlet or other power source. The height of the stand 104 can be adjustable to match the height of an operator.

Assembly 100 also includes a steam supply system. The entirety of the steam supply system of assembly 100 is not shown in the figures. It will be understood that any number of steam supply systems known in the art may be used. In the present disclosure, the steam supply system includes a number of components including a steam producing component (further described below) and conduits 116 for transporting steam from the steam producing component into the assembly 100 for steaming the trim cover 120. At least a portion of the conduits 116 is within the interior of frame 102. Conduits 116 may be steam hoses, valves or other means for transporting heat or steam from the steam supply system into and through frame 102. Frame 102 may also include one or more steam ports 113, which may be connected to conduits 116 for transporting steam from the steam producing component into the assembly 100. The number of steam ports 113 may be equal to the number of conduits 116 and may also correspond to the number of steam zones of the trim cover 120 to which steam is to be applied. The steam ports 113 allow steam to be applied to the interior steam zones of the trim cover. The number of steam zones and steam ports 113 may be varied depending on the required steam temperature, and the required uniformity of the temperatures of each of the steam zones and the assembly 100.

The steam producing component may be a steam boiler or other steam producing component known in the art. In at least some embodiments, the steam producing component is a three port VEIT™ model 2373 with two 10, 20 or 30 kilowatt (kW) heater elements. The embodiment shown in FIGS. 1 to 4 has three steam zones approximately at the top, center, and bottom of the frame 102 and through which steam is directed approximately uniformly to the top, center, and bottom of trim cover 120 when trim cover 120 is placed over frame 102 and assembly 100 is in use.

In some embodiments, steam is directed towards a first zone through one of the tubes of metal tubing 110 approximately at the top of frame 102, steam is directed towards a second zone through a tube approximately at the bottom of frame 102, and steam is directed towards a third zone through approximately the center of frame 102. Alternatively, the zones could also be created and defined to direct steam to the right, left, and center of the frame 102 without varying from the scope of the invention. Steam supply to each of the steam zones is activated via a control panel (such as for example, control panel 118 (FIG. 3), which may be a control panel that also controls the steam supply system). Steam supply to each steam zone may also have an independent timer relay which may be adjusted based on the demand, whereby the time interval for which the steam is supplied to the frame 102 is controlled.

In at least some embodiments, each steam zone can be activated independently of the other steam zones to unevenly direct steam toward the trim cover 120. In some embodiments, the steam zones may be activated simultaneously for even steaming of trim cover 120. In this manner, control of the steam flow within conduits 116 can provide a variety of steam volume options to maintain temperature and uniformity of the steam. In some embodiments, the steam cycle can be adjustable from 0-60 seconds. The temperature applied to each steam zone can be identical, though depending on the level and distribution of wrinkles or imperfections of the trim cover 120, the temperature may be varied for non-uniform application of steam to trim cover 120.

Figure 3:
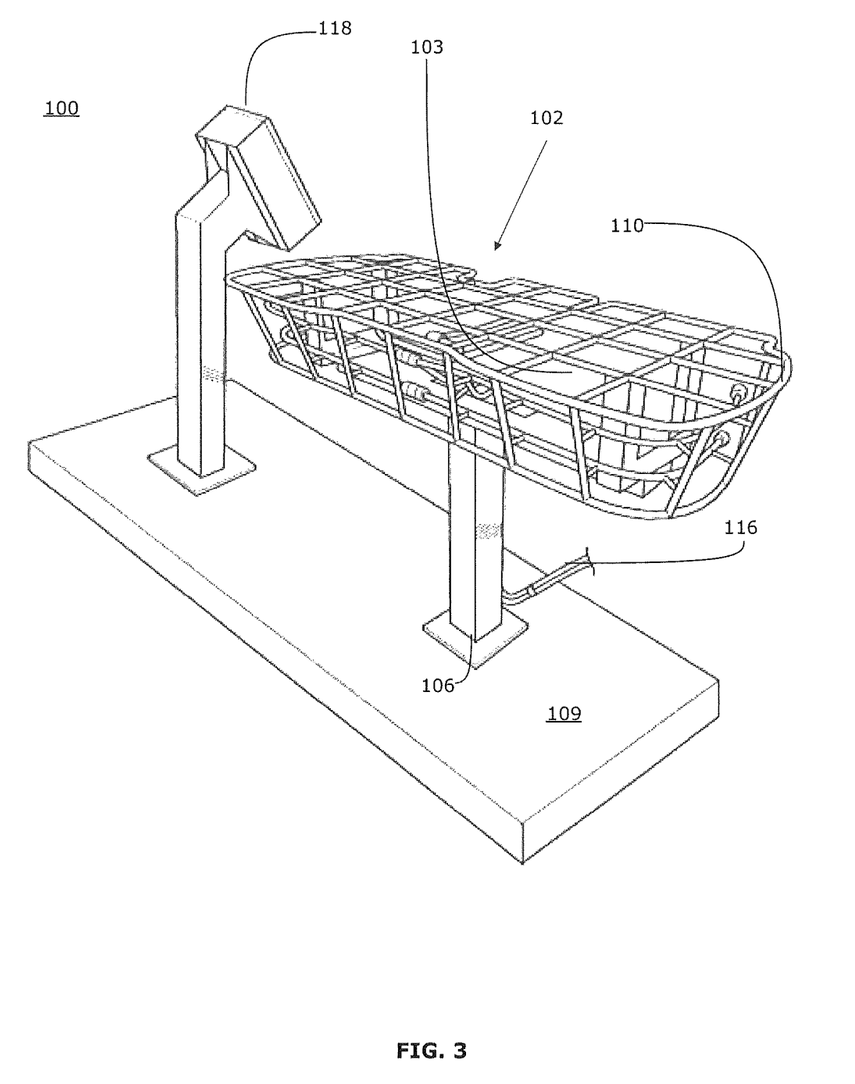
FIG. 3 is a perspective view of the assembly of FIG. 1 and a control panel in accordance with an embodiment of the present disclosure.

The control panel 118 shown in FIG. 3 and which may be a part of assembly 100 may be an external panel and may include one or more control buttons, foot pedals or the like. The control panel 118 can also be mounted to a portion of the stand 104 for access by a user such as a machine operator or may be a separate assembly as shown in FIG. 3. Other types of controls may be operated manually, optically, vocally, or otherwise by the user. There also may be automated controls for operating the assembly 100, which can be mounted either on or adjacent to stand 104 or another component of assembly 100.

To ensure sufficient temperature and dryness of the steam, conduits 116 can be insulated using fiberglass, steam insulation jackets or other insulating means known in the art.

Referring again to FIGS. 1 to 4, stand 104 has bottom and top ends 106, 108, respectively. Bottom and top ends 106, 108 of stand 104 are connected by a support beam 107 that extends from bottom end 106 to top end 108. As shown in FIG. 1, the assembly 100 can be positioned on a relatively flat surface by means of bottom end 106 of stand 104 being disposed on a base 109, which may be a pallet, a floor, the ground or other substantially flat surface to support frame 102. Additional support beams (not shown) may be used to support the weight of frame 102. The additional stands may be made of metal, wood, or other suitable material and can be connected to the top end 108 of stand 104 and extend downwardly towards the bottom end 106 of stand 104 to rest on the surface on which assembly 100 is placed. In the embodiment shown in FIG. 1, frame 102 is fixedly connected to stand 104 by means of welding or other connection means known in the art. However, in some embodiments, frame 102 may be releasably connected to stand 104 by means of screws, bolts, spline joints, keys and pins, clamp joints or other connecting means known in the art.

Frame 102 is an open wire-framed shape comprised of welded or other conjoined metal tubing 110 with interspersed holes 103 within frame 102. Metal tubing 110 makes up the "skeleton" of the frame 102 on which the trim cover 120 is mounted when assembly 100 is in use. In a preferred embodiment, metal tubing 110 is high quality stainless steel, though it will be understood that various other metals may be used provided they have sufficient thermal conductivity and strength to support the trim cover. Metal tubing 110 may be machined or patterned into a desired shape of frame 102. Frame 102 can have a height, length, and width that is approximately the height, length, and width the vehicle seat cushion or other upholstered article on which trim cover 120 is placed. The embodiment shown in FIGS. 1 to 4 is for a trim cover that fits a rear seat cushion of an automobile vehicle. However, differently sized frames may be used for a driver seat cushion, a passenger seat cushion, a bench seat, a bucket seat, a 60% bench seat, a 40% bench seat, or for another upholstered article such as a couch, chair or the like. Frame 102 may be adjustable or may be of a single piece integral construction.

Figure 4:
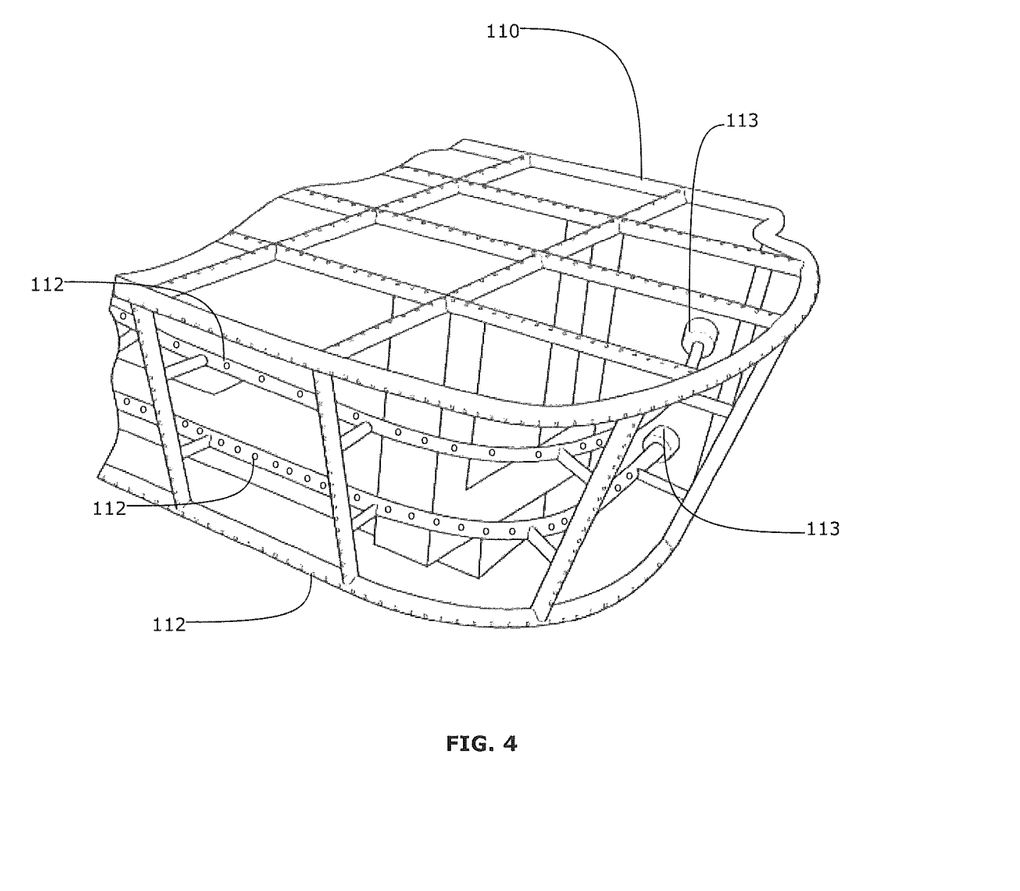
FIG. 4 is an enlarged view of a portion of a frame of the assembly of FIG. 1.

Metal tubing 110 includes a plurality of apertures 112 disposed along the exterior of metal tubing 110. The apertures 112 are operable to facilitate the transport of fluids such as gas, air, or steam through metal tubing 110 and to allow steam to travel out from within the metal tubing 110 after steam has been applied to the frame 102 via the steam ports 113. As shown in FIG. 4, the apertures 112 may be uniformly spaced along the top of the metal tubing 110. However, it will be understood that the apertures 112 may be spaced non-uniformly or differently oriented to facilitate the egress of steam through the apertures 112.

Frame 102 may include a shield portion or baffle 114 at a rear end of frame 102. Shield portion 114 may be a solid metal plate substantially free of holes or apertures and can be integrally connected to frame 102 by welding or other means known in the art. Shield portion 114 is used to contain a volume of steam, or another gaseous fluid, within assembly 100 and to prevent steam or heat from escaping from the rear of the assembly 100. For example, shield portion 114 may be used where the trim cover 120 has an open rear flap through which steam may escape, but for the presence of shield portion 114. Accordingly, it will be understood that shield portion 114 may not be necessary depending on the design of the trim cover 120 (i.e. shield portion 114 may not be required where the trim cover 120 is a "pillowcase" design without any open flaps or other openings from which steam can easily escape). It will also be understood that the shield portion 114 can be oriented in any location of the frame 102 to contain steam within frame 102 where necessary.

Assembly 100 may be placed at an operator's work station or in a production line or factory. To use assembly 100 to de-wrinkle a trim cover 120 of a vehicle seat cushion, the operator takes a trim cover 120 and stretches it over the frame 102. The operator then uses the control panel 118 of the steam supply system, which is configured for different levels of steam heating to apply steam to the different steam zones and can further control the time interval for which steam is applied to the trim cover 120. After the time interval is complete, the operator removes the heated trim cover 120 from frame 102. The trim cover 120 may then be stored or may immediately be placed over the cushioned pad, which in this embodiment involves placing the trim cover 120 over the vehicle seat cushion. Placing the trim cover 120 over the vehicle seat cushion after steaming and/or heating allows for a better fit and results in fewer wrinkles. Additional finishing steps may be applied to the vehicle seat cushion after the heated seat trim cover 120 is installed. However, the use of assembly 100 results in ease of installation for the operator and a more aesthetically pleasing product. Using assembly 100 also provides advantages over existing systems as steam can be applied uniformly and controllably to multiple interior steam zones of the trim cover 120 as described herein.

Methods of steaming and/or heating a trim cover 120 of an upholstered article such as a vehicle seat cushion are described in further detail below with reference to FIGS. 5 to 10. Specifically, referring to FIG. 5, a method of heating a trim cover 120 of an upholstered article using steam is shown.

Figure 5:
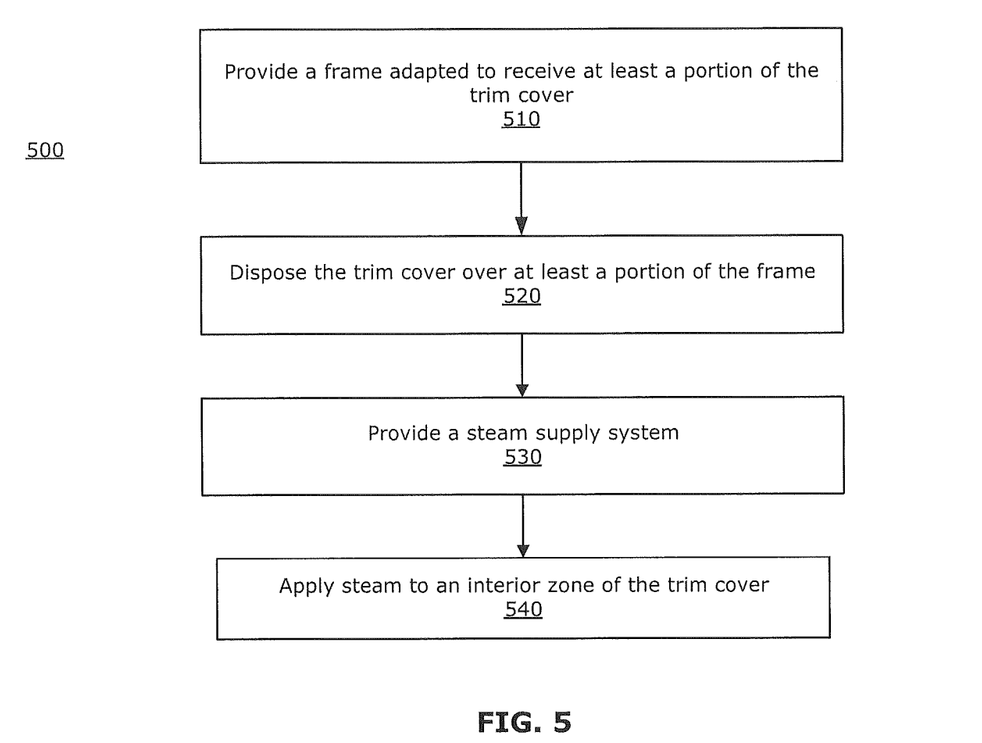
FIG. 5 is a flow chart of a method of steaming and/or heating a trim cover in accordance with one embodiment of the present disclosure.

The method includes providing a frame 102 adapted to receive at least a portion of a trim cover, such as trim cover 120 (510). The frame can be frame 102 as described herein or may be any other suitable frame that corresponds to the dimensions of the trim cover 120 and/or the upholstered article. The method also includes disposing the trim cover over at least a portion of the frame (520).

Figure 6:
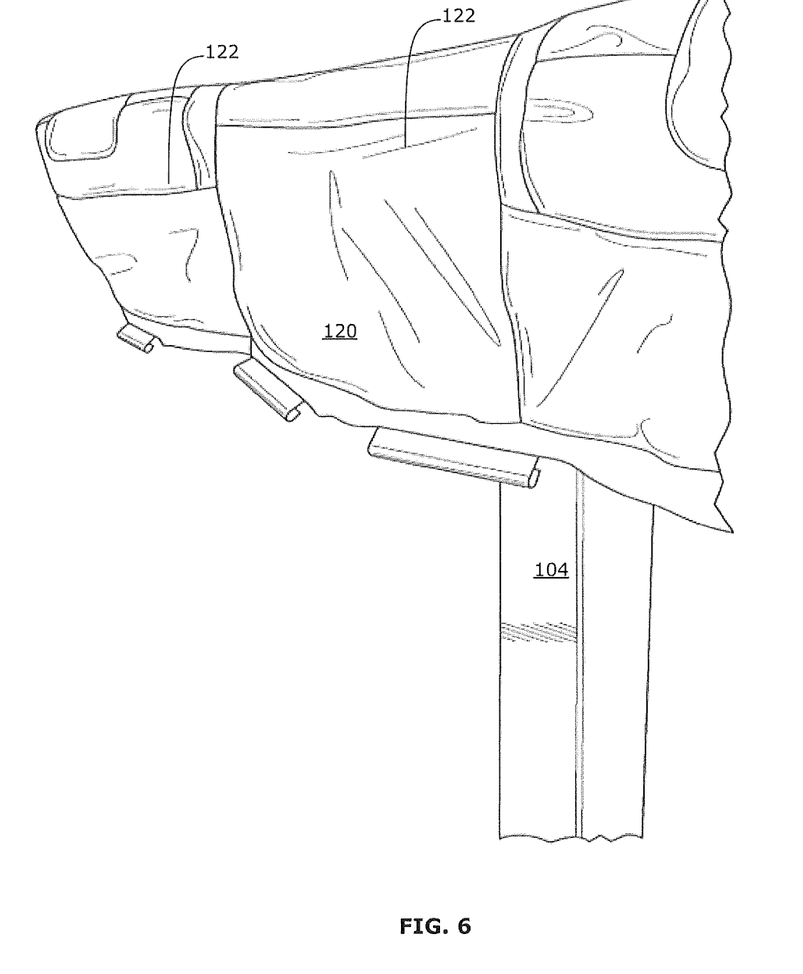
FIG. 6 is fragmentary a perspective view of the assembly of FIG. 1 with an installed trim cover prior to the application of steam and/or heat to the trim cover.
Figure 7:
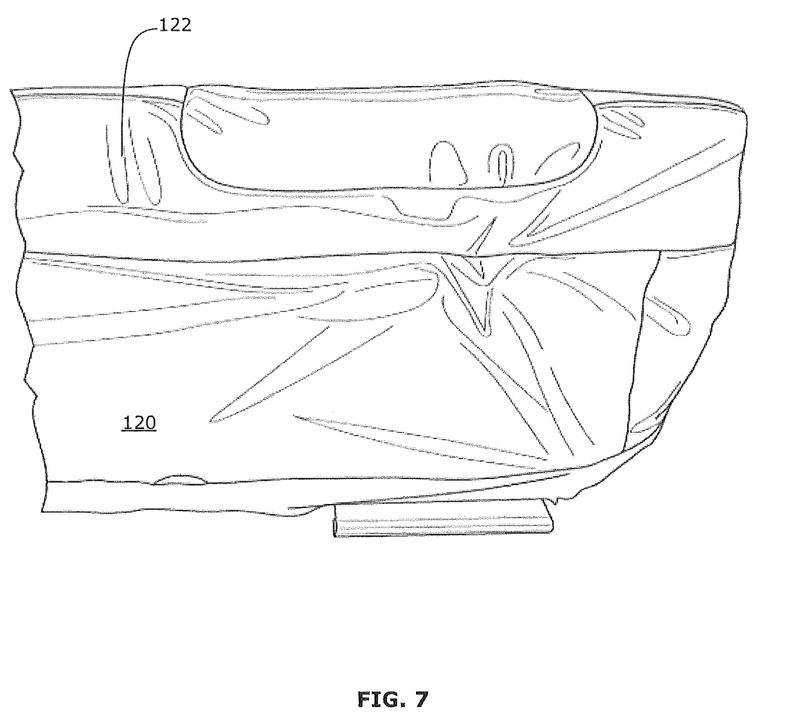
FIG. 7 is a further fragmentary perspective view of the assembly of FIG. 6.
Figure 8:
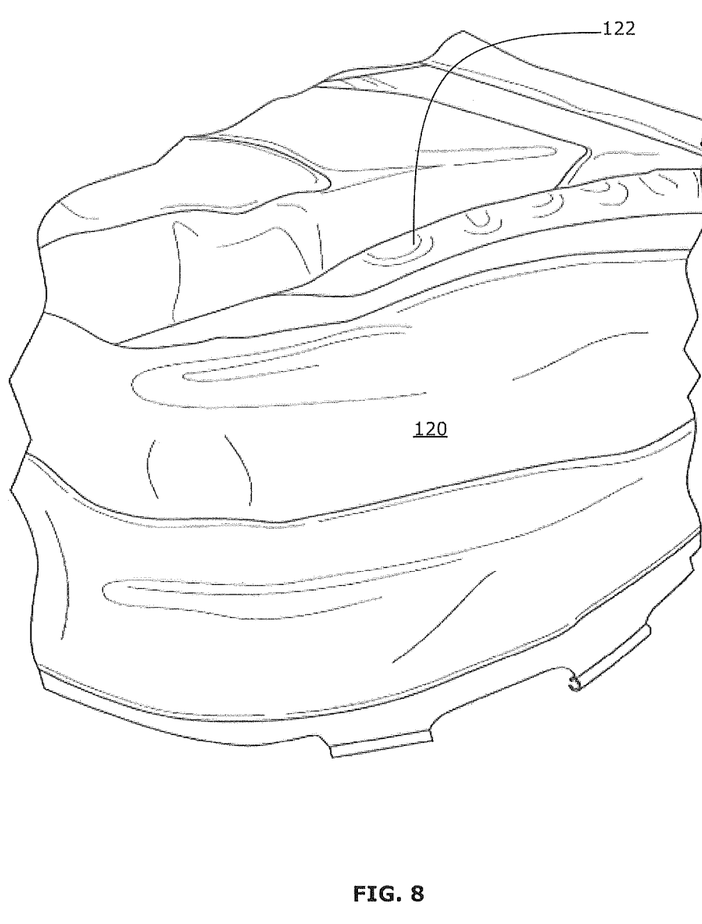
FIG. 8 is a fragmentary close-up view of the assembly of FIG. 6.
Figure 9:
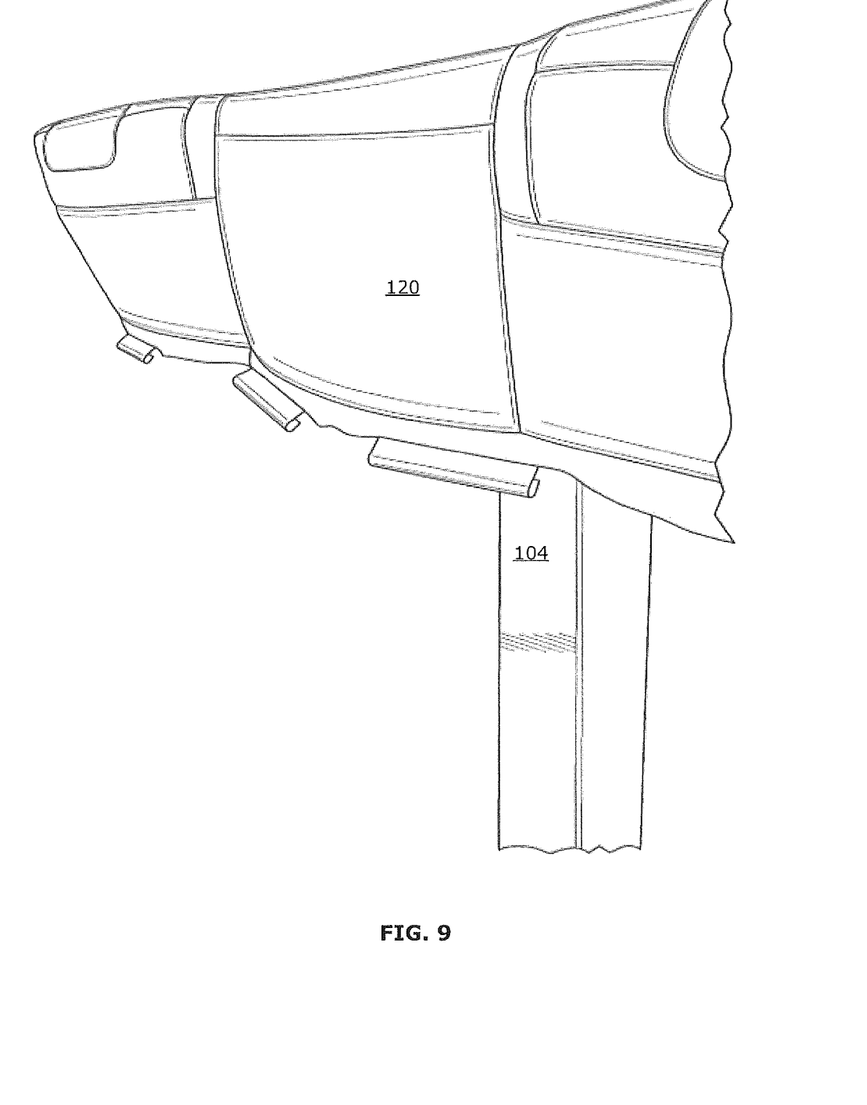
FIG. 9 is a fragmentary perspective view of the assembly of FIG. 6 after the application of steam and/or heat to the trim cover.
Figure 10:
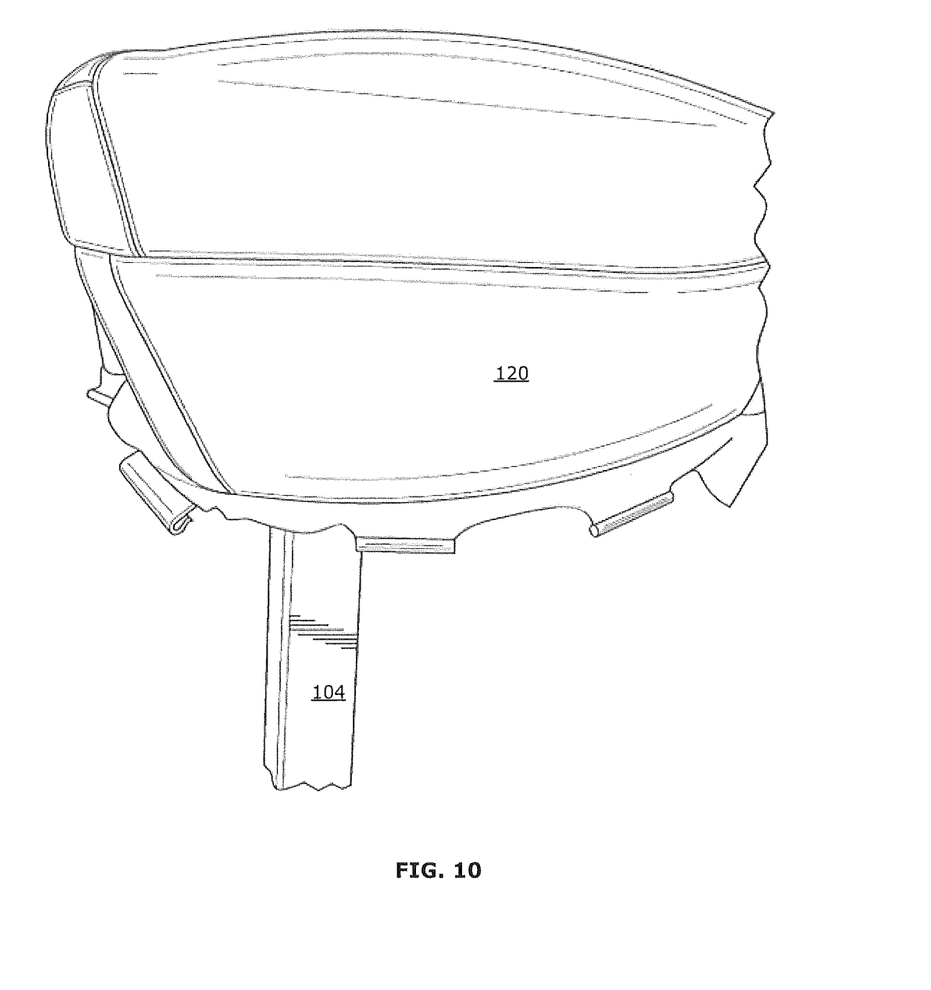
FIG. 10 is a fragmentary close-up view of the assembly of FIG. 9.

Referring to FIGS. 6 to 10, in some embodiments, the trim cover 120 may be tightly wrapped around the frame 102 for steaming and/or heating the trim cover 120 before it is placed on the vehicle seat cushion. As seen in FIGS. 6 to 8, the trim cover 120 may have wrinkles or other imperfections 122 that are visible after the trim cover 120 has been placed over the frame 102.

The method further includes providing a steam supply system, with at least one portion of the steam supply system being within the frame 102 (530). As described above, the steam supply system may include a steam producing component. The steam producing component may be connected to the frame 102 by means of conduits such as conduits 116 extending into frame 102.

After the trim cover 120 has been placed over the frame 102, steam is applied to a plurality of interior steam zones of the trim cover 120 via the conduits 116 (540). The steam travels through the conduits 116 which are connected to the frame 102 via the steam ports 113 and into the frame 102 and then heats the zones of the trim cover 120 as described above to de-wrinkle the trim cover 120 as shown in FIG. 7.

FIGS. 6 to 8, and 9 and 10 show close-up views of the trim cover 120 before and after steam has been applied, respectively. After the steam has been applied to trim cover 120, the trim cover 120 is then more pliable, less wrinkled and more aesthetically pleasing. The heated trim cover 120 may subsequently be placed by an operator over the cushioned pad of a vehicle seat cushion and additional finishing steps may be applied to trim cover 120.

The embodiments of the present application described above are intended to be examples only. Those of skill in the art may make alterations, modifications and variations to the particular embodiments without departing from the intended scope of the present application. In particular, features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present application as a whole. The subject matter described herein and in the recited claims intends to cover and embrace all suitable changes in technology.

The scope of the invention should not be limited by the preferred embodiments set forth in the examples but should be given the broadest interpretation consistent with the description as a whole. The claims are not to be limited to the preferred or exemplified embodiments of the invention.

The invention claimed is:

1. An assembly for heating a trim cover of an upholstered article, the assembly comprising:
   a stand having a bottom end and a top end;
   an open frame attached to the top end of the stand and operable to receive at least a portion of the trim cover, wherein the open frame comprises a plurality of steam zones; and
   a steam supply system, wherein at least a portion of the steam supply system is adapted to fit within the frame of the assembly and the steam supply system is adapted to apply steam to one of the plurality of steam zones independently from another of the plurality of steam zones, wherein the one of the plurality of steam zones heats a different portion of the trim cover than the other of the plurality of steam zones.

2. The assembly of claim 1 wherein the frame is comprised of metal tubing.

3. The assembly of claim 2 wherein said metal tubing includes a plurality of steam ports.

4. The assembly of claim 2 wherein the metal tubing comprises a plurality of apertures disposed on the exterior of the metal tubing.

5. The assembly of claim 1 wherein the frame further comprises a shield portion for containing a volume of steam within the assembly.

6. The assembly of claim 1 further comprising a timer mechanism for controlling an interval of time for which the steam supply system applies steam.

7. The use of the assembly of claim 1 for de-wrinkling the trim cover.

8. A method for heating a trim cover of an upholstered article, the method comprising:
   providing a frame adapted to receive at least a portion of the trim cover, wherein the frame comprises a plurality of steam zones;
   disposing the trim cover over at least a portion of the frame;
   providing a steam supply system wherein at least a portion of the steam supply system is adapted to fit within the frame; and
   applying steam to one of the plurality of steam zones independently from another of the plurality of steam zones, wherein the one of the plurality of steam zones heats a different portion of the trim cover than the other of the plurality of steam zones.

9. The method of claim 8 further comprising securing the trim cover in position over the frame.

10. The method of claim 8 further comprising controlling the interval of time steam is applied to the trim cover.

11. The method of claim 8 wherein the step of applying steam to the trim cover is performed before the trim cover is placed over a cushioned pad of a vehicle seat cushion.

12. An assembly for de-wrinkling a trim cover of a cushioned pad of a vehicle seat cushion, the assembly comprising:
   a stand having a bottom end and a top end;
   an open frame attached to the top end of the stand, the frame being comprised of metal tubing, wherein the frame is approximately the height, width, and length of the vehicle seat cushion and is adapted such that the trim cover can be stretched tightly over the frame, and wherein the frame further comprises a plurality of steam zones; and
   a steam supply system, wherein at least a portion of the steam supply system is adapted to fit within the frame and the steam supply system is adapted to apply steam to one of the plurality of steam zones independently from another of the plurality of steam zones, wherein the one of the plurality of steam zones heats a different portion of the trim cover than the other of the plurality of steam zones.

13. The assembly of claim 1 wherein the steam supply system is adapted to apply steam to the one of the plurality of steam zones at a different temperature from the other of the plurality of steam zones.

14. The assembly of claim 1 wherein the steam supply system is adapted to apply steam to the one of the plurality of steam zones for a different time period than the other of the plurality of steam zones.

15. The method of claim 8 wherein the steam is applied to the one of the plurality of steam zones at a different temperature from the other of the plurality of steam zones.

16. The method of claim 8 wherein the steam is applied to the one of the plurality of steam zones for a different time period than the other of the plurality of steam zones.

17. The assembly of claim 12 wherein the steam supply system is adapted to apply steam to the one of the plurality of steam zones at a different temperature from the other of the plurality of steam zones.

18. The assembly of claim 12 wherein the steam supply system is adapted to apply steam to the one of the plurality of steam zones for a different time period than the other of the plurality of steam zones.

* * * * *